(12) United States Patent
Quercetti

(10) Patent No.: US 6,286,835 B1
(45) Date of Patent: Sep. 11, 2001

(54) BASKET BOX FOR CONTAINING A GAME, INCLUDING A BLACK-BOARD

(76) Inventor: Alessandro Quercetti, Strada San Vito a Revigliasco 48, I-10133 Torino (IT)

( * ) Notice: Subject to any disclaimer, the term of this patent is extended or adjusted under 35 U.S.C. 154(b) by 0 days.

(21) Appl. No.: 09/494,037

(22) Filed: Jan. 31, 2000

(30) Foreign Application Priority Data

Jan. 29, 1999 (IT) ............................................. TO990018 U

(51) Int. Cl.$^7$ ....................................................... A63F 3/00
(52) U.S. Cl. ............................................. 273/287; 273/285
(58) Field of Search .................................... 273/287, 286, 273/269, 280, 284, 285; 40/312, 313

(56) References Cited

U.S. PATENT DOCUMENTS

| | | |
|---|---|---|
| 139,425 | * 5/1873 | Schindler . |
| 880,590 | * 3/1908 | Sommer . |
| 4,127,948 | 12/1978 | Chin et al. . |
| 4,427,391 | 1/1984 | Berman . |
| 4,534,565 | * 8/1985 | Hube . |

* cited by examiner

Primary Examiner—Benjamin H. Layno
Assistant Examiner—Vishu Mendiratta
(74) Attorney, Agent, or Firm—Young & Thompson

(57) ABSTRACT

A basket-like box intended to contain elements for a game which requires a black-board, the black-board also serving as a cover for the box, and this latter on its turn serving as a support for keeping the black-board in a working position. To the rear part of the box there are sideways pivoted the end portions of two levers, to the opposite end portions of which is pivoted the black-board, whereby when the black-board is lowered it places itself onto the opening edge of the box, thus forming the cover thereof, whereas the raised black-board rests onto the box edge, and it is kept in working position. The upper side edges of the box are shaped with a series of teeth which enable obtaining different stable working positions of the black-board resting on said teeth. The front end portions of the levers are provided with spring latches suitable for co-operating with stops of the box edges in order to keep the black-board in its position of closed cover until said latches are opened in order to allow opening the box. The black-board can be overturned for being exploited on both its faces.

4 Claims, 2 Drawing Sheets

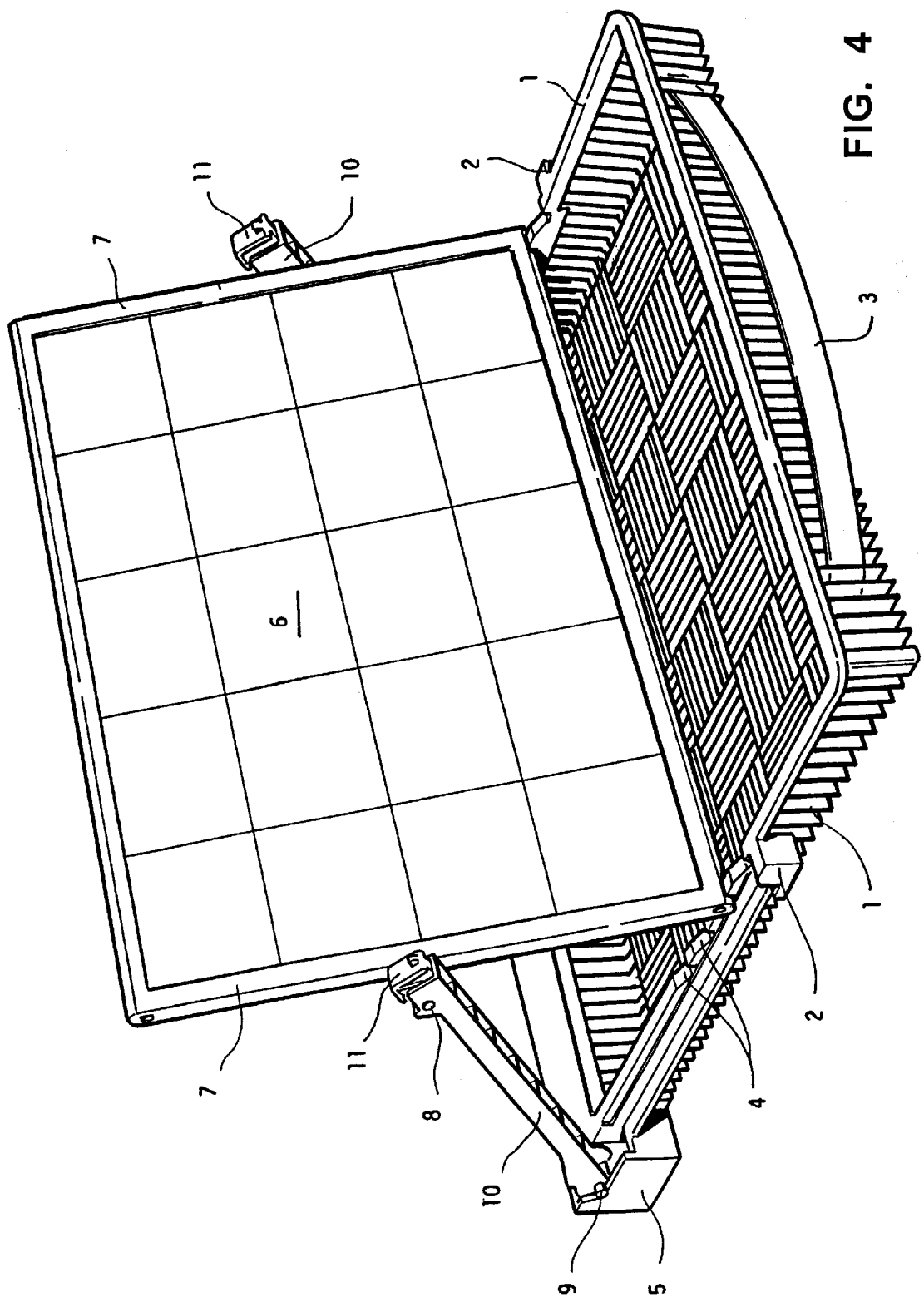

BASKET BOX FOR CONTAINING A GAME, INCLUDING A BLACK-BOARD

BACKGROUND OF THE INVENTION

This invention refers to a basket-like box intended for containing elements for a game which requires a black-board, the black-board also serving as a cover for the box, and this latter on its turn serving as a support for keeping the black-board in an erected position for use.

A box of this kind is described in the Italian Application for Utility Model No. TO 94 U 000 232 of the same Applicant, and it has at its opening an edge suitable for receiving as a cover a black-board; the box is provided with inner support means which can be erected for supporting the black-board in its working position. This box affords several advantages, due to its basket-like structure, which enables reducing the amount of material used in its manufacture and, correspondingly, the amount of material to be wasted or recycled when the box is disposed of, and which allows a certain observation of the contents and the coming out of dust and little chips introduced by accident, and also due to the use of the black-board as a cover, whereby this latter is suppressed as a separate component; moreover, this box supports in effective manner the black-board when in use.

However this box has the drawback that, in order to displace the black-board from its position as cover to its working position, the black-board should be disengaged from the box and laid down near the box, the inner support means should be erected, and finally the black-board should be put in its working position, in which it is supported by the box and the support means. The inverse operations are required in order to close the box. The whole of these operations may be regarded as somewhat disturbing. Moreover, since the black-board is materially separated from the box, there is the possibility that it gets lost or it cannot be immediately found when the user wants to close the box.

BRIEF SUMMARY OF THE INVENTION

The object of the present invention is therefore to improve the known basket box by increasing its practicality of use and, particularly, simplifying in substantial manner the operations needed for displacing the black-board from its position as cover to its working position and vice-versa, and excluding any danger that the black-board be accidentally separated from its box.

The subject of the present invention is a basket box intended to contain elements for a game which requires a black-board, the black-board also serving as a cover for the box, and this latter on its turn serving as a support for keeping the black-board in an erected position for use, characterized in that to the rear part of the box there are sideways pivoted the rear end portions of two levers, to the front end portions of which is pivoted the blackboard, the length of the levers and the position in which they are pivoted to the black-board being such that when the black-board is lowered it places itself onto the opening edge of the box, thus forming the cover thereof, whereas the raised black-board can be put to rest onto the box edge, and it is then kept in its working position.

This way the black-board remains permanently connected to the box and it cannot be unintentionally detached therefrom, and the operations needed for displacing the black-board from its position as cover to its working position and vice-versa are reduced to the maximum possible simplicity.

Preferably, some portions of the upper side edges of the basket box are shaped with a series of teeth which enable obtaining different stable working positions of the black-board resting on said teeth.

Preferably, the front end portions of the levers are provided with spring latches suitable for co-operating with stops of the box edges in order to keep the black-board in its position of closed cover until said latches are opened in order to allow opening the box.

Preferably, the pivot connection of the levers to the black-board takes place near the middle line of the black-board, whereby this latter can be overturned for being exploited on both its faces, which can be different from one another.

BRIEF DESCRIPTION OF THE DRAWINGS

These and other features, objects and advantages of the subject of the present invention will appear more clearly from the following description of an embodiment, having the character of a non limiting example, with reference to the appended drawings, wherein:

FIG. 4 shows a perspective view of the open box having the black-board in working position.

DETAILED DESCRIPTION OF THE PREFERRED EMBODIMENT

Figure 3:
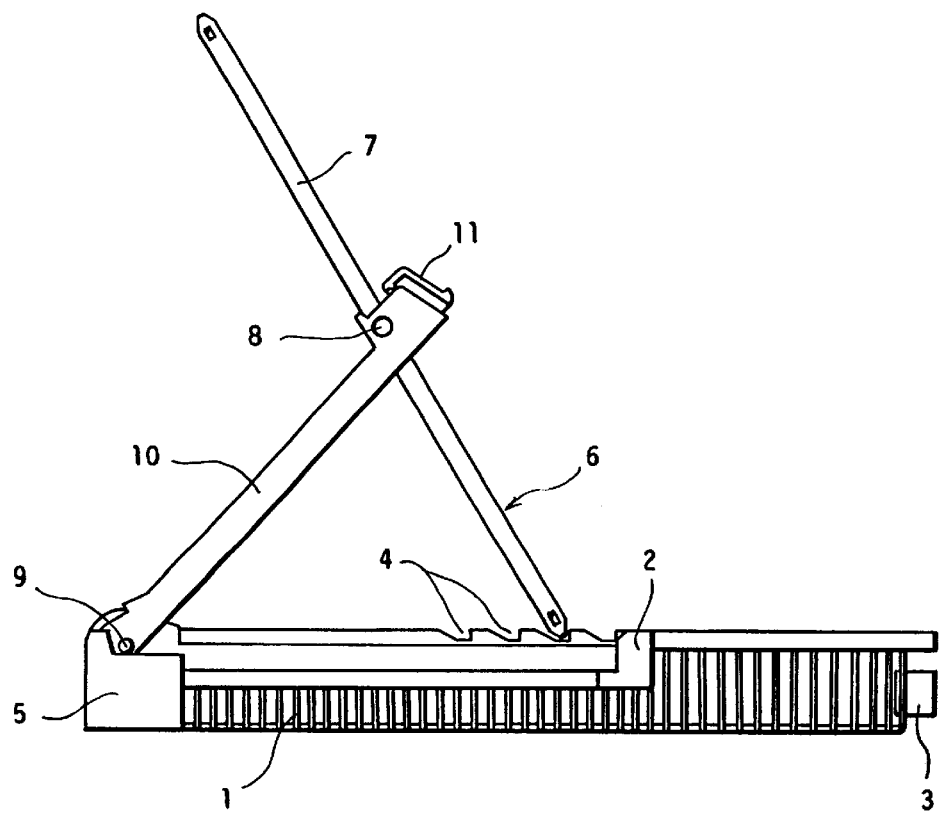
FIG. 3 shows in a similar way the open box having the black-board in working position.
Figure 1:
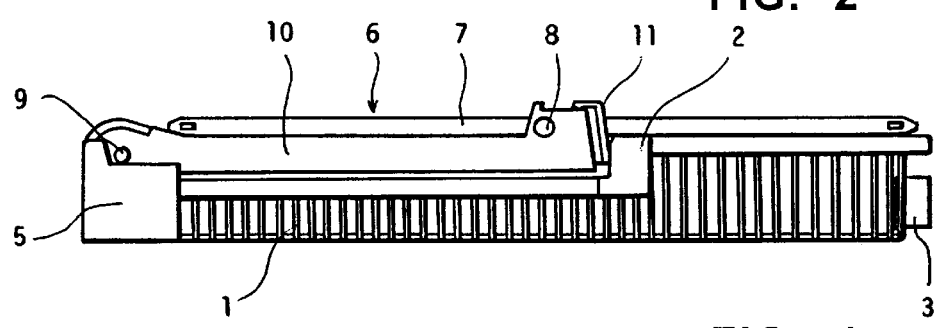
FIG. 1 shows a side view of the closed box having the black-board in the position of a closed cover.

Number 1 designates a basket-like box suitable for containing the elements (not shown) of a game which requires the use of a black-board 6 when this latter is set in a more or less erected working position (FIGS. 3 and 4). For example, the game elements could be magnetic letters, digits and drawing elements, suitable for adhering to the surface of black-board 6, whose structure in such case should be, at least inside, ferromagnetic, and is included in a frame 7. The same black-board, when lowered onto the upper edge of box 1, forms a cover for this box (FIG. 1).

According to this invention, at the side ends of the rear edge of box 1 there are provided supports 5, to each of whom is pivoted, by means of an axle 9, the rear end portion of a lever 10 which, at its front end portion, houses an axle 8 protruding from the frame 7 of black-board 6, whereby this latter can rotate with respect to the lever 10.

Therefore, it is possible to raise the black-board 6 from the upper edge of box 1 on which it was seated as a cover (FIG. 1) and, passing through intermediate positions (FIG. 2), to displace the black-board into a working position (FIG. 3), in which its bottom edge rests on the side edges of box 1. It is of advantage that these side edges of box 1 are provided with teeth 4, which enable to select different stable working positions of the black-board which rests on said edges.

Advantageously, the axles 8 are situated near the middle length of the sides of frame 7, whereby the black-board 6 can be brought in working position in two situations mutually displaced by 180°, and therefore enables to exploit both surfaces of the black-board, which can for example be printed or drawn in different manner, or have different features.

The structure of black-board 6 may possibly be formed by several separated sheets, and it can be embedded in frame 7 when molding from plastic material the same with its axles 8.

Figure 2:
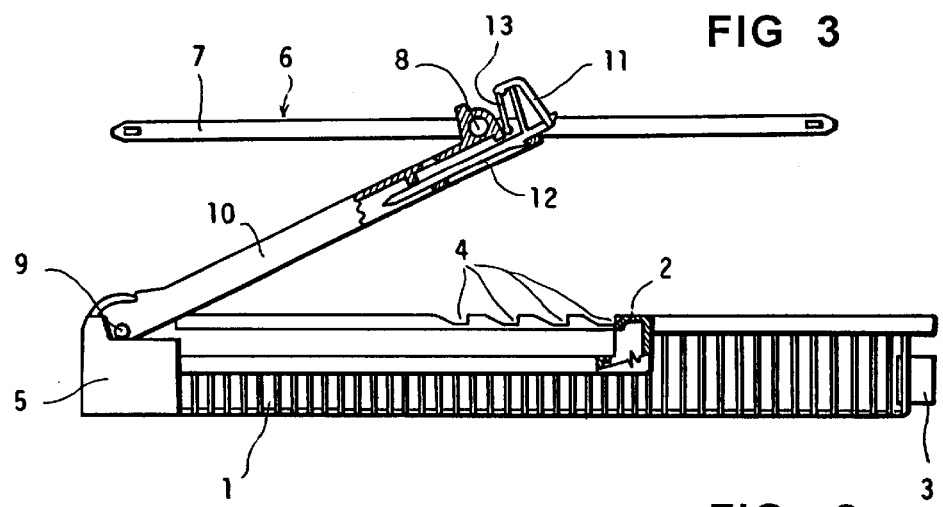
FIG. 2 shows in a similar way the open box, having the black-board in the course of being raised for being displaced in the working position.

Advantageously the front end portions of levers 10 are provided with elastic latches 11 suitable for engaging stops 2, protruding from the side edges of box 1, when the black-board is brought to its position of closed cover, in order to keep the same in this position. The structure of latches 11 and stops 2 is shown in FIG. 2, wherein the corresponding portions of the box edges, levers and latches are shown in section. Each latch 11 has a shaft 12 inserted within the corresponding lever 10 in order to guide the latch and limit its stroke. Each latch has an elastic projection 13 which, by resting against the end portion of lever 10, pushes outwards the latch. Thanks to this structure, which is extremely easy to manufacture economically, the latches will detent automatically in engagement with the stops 2 when cover 6 is closed, and it is sufficient to push on them for freeing the cover and be enabled to open the box.

Advantageously the box 1 is provided with a handle 3 for its transport.

This invention should not be construed as limited to the embodiment described and shown by way of example. Several possible modifications will be evident to those skilled in the art. For example, the basket-like structure of the box may be realized according to different drawings, its size and proportions may vary, the constructive details may be designed in various manners and, of course, the box is not limited to contain the elements for a magnetic black-board but may be exploited for containing game elements co-operating in any manner with a blackboard or similar member.

What is claimed is:

1. A basket-like box intended to contain elements for a game, including a body having a upper edge, said upper edge comprising a rear portion, a front portion and side portions, said box including a black-board having an outline corresponding to said upper edge of the box, and the box further comprising two levers, each said lever having a rear end portion and a front end portion, the rear end portion of each said lever being pivoted to one of said side portions of the upper edge of the box body near said rear portion of said upper edge, and the front end portion of each said lever being pivoted to said black-board, wherein said black-board can be raised and lowered with respect to said box body by oscillating said levers, said black-board remaining always connected to said box body, the length of said levers and the position in which they are pivoted to the black-board being such that when the black-board is lowered it places itself to rest onto said upper edge of the box body, thus forming a cover, whereas the raised black-board can be put to rest onto said side portions of the upper edge of the box body, thus being kept in a working position, and wherein some portions of said side portions of the upper edge of the box body comprise a series of teeth, thus enabling obtaining different stable working positions of the black-board resting on said teeth.

2. A basket box as set forth in claim 1, wherein said black-board has two faces different from one another and has a middle line, and said levers are pivoted to the black-board near said middle line, whereby the black-board can be overturned for being exploited on both its faces.

3. A basket-like box intended to contain elements for a game, including a body having a upper edge, said upper edge comprising a rear portion, a front portion and side portions, said box including a black-board having an outline corresponding to said upper edge of the box, and the box further comprising two levers, each said lever having a rear end portion and a front end portion, the rear end portion of each said lever being pivoted to one of said side portions of the upper edge of the box body near said rear portion of said upper edge, and the front end portion of each said lever being pivoted to said black-board, wherein said black-board can be raised and lowered with respect to said box body by oscillating said levers, said black-board remaining always connected to said box body, the length of said levers and the position in which they are pivoted to the black-board being such that when the black-board is lowered it places itself to rest onto said upper edge of the box body, thus forming a cover, whereas the raised black-board can be put to rest onto said side portions of the upper edge of the box body, thus being kept in a working position, and wherein said front end portions of the levers comprise spring latches, and said side portions of the upper edge of the box body comprise stops, whereby the cooperation of said latches and stops keeps the lowered black-board in a position of closed cover until said latches are opened in order to allow opening the box.

4. A basket box as set forth in claim 3, wherein each said latch has a shaft inserted within the corresponding lever in order to guide the latch and to limit its displacements, and each said latch has an elastic projection which rests against the end portion of the lever and pushes outwards the latch.

* * * * *